US010745131B2

(12) United States Patent
Thomas et al.

(10) Patent No.: US 10,745,131 B2
(45) Date of Patent: Aug. 18, 2020

(54) BELLY-MOUNTED LOAD BEAM FOR AN AERIAL VEHICLE

(71) Applicant: Boost Human External Cargo Systems Inc., North Vancouver (CA)

(72) Inventors: Derek Thomas, North Vancouver (CA); Jeff Yarnold, North Vancouver (CA)

(73) Assignee: BOOST HUMAN EXTERNAL CARGO SYSTEMS INC., North Vancouver (CA)

(*) Notice: Subject to any disclaimer, the term of this patent is extended or adjusted under 35 U.S.C. 154(b) by 385 days.

(21) Appl. No.: 15/794,929

(22) Filed: Oct. 26, 2017

(65) Prior Publication Data

US 2018/0111687 A1 Apr. 26, 2018

Related U.S. Application Data

(60) Provisional application No. 62/413,405, filed on Oct. 26, 2016.

(51) Int. Cl.
*B64D 1/22* (2006.01)
*B64D 1/02* (2006.01)
*B64D 9/00* (2006.01)

(52) U.S. Cl.
CPC .............. *B64D 1/22* (2013.01); *B64D 1/02* (2013.01); *B64D 9/00* (2013.01)

(58) Field of Classification Search
CPC .............. B64D 1/22; B64D 1/02; B64D 9/00
See application file for complete search history.

(56) References Cited

U.S. PATENT DOCUMENTS

| 2,692,744 | A | * | 10/1954 | Burkhard | B64D 1/02 244/137.3 |
|---|---|---|---|---|---|
| 3,904,156 | A | * | 9/1975 | Smith | B64D 1/22 244/118.1 |
| 4,138,078 | A | | 2/1979 | Hester et al. | |
| 4,984,757 | A | | 1/1991 | Hartung | |
| 5,593,113 | A | * | 1/1997 | Cox | B64D 1/08 177/245 |
| 8,888,048 | B2 | | 11/2014 | Figoureux et al. | |
| 2012/0193476 | A1 | * | 8/2012 | Figoureux | B64D 1/22 244/131 |
| 2014/0252170 | A1 | | 9/2014 | Prud'Homme-Lacroix | |
| 2015/0360779 | A1 | * | 12/2015 | Behrens | B64D 1/22 244/137.4 |
| 2016/0236779 | A1 | | 8/2016 | Thomas et al. | |

* cited by examiner

Primary Examiner — Rodney A Bonnette

(57) ABSTRACT

A load beam for an aerial vehicle comprises an elongate beam having a bottom. There is a plurality of load attachment points disposed along the bottom of the elongate beam. Each of the load attachment points is configured to selectively couple to a load such that the load is coupled to a first one of the load attachment points, or the load is coupled to a second one of the load attachment points and a third one of the load attachment points, whereby the load is connected to the load beam so as to be airlifted by the aerial vehicle.

20 Claims, 16 Drawing Sheets

BELLY-MOUNTED LOAD BEAM FOR AN AERIAL VEHICLE

TECHNICAL FIELD

The present disclosure relates to a load beam, and in particular, to a belly-mounted load beam for an aerial vehicle.

BACKGROUND

United States Patent Application Publication Number 2016/0236779, which published on Aug. 18, 2016 in the name of Thomas et al., discloses a load beam for an aerial vehicle. The load beam comprises an elongate beam with a radial slot and a lug extending from the radial slot. A hook is pivotably connected to the lug. There is a first arm pivotably connected to the elongate beam and a second arm pivotably connected to the elongate beam. The first arm may be pivotably connected to a first mount and the second arm may be pivotably connected to a second mount. A pivot axis of the first arm relative to the elongate beam may be substantially parallel to a pivot axis of the first arm relative to the first mount. A pivot axis of the second arm relative to the elongate beam may be substantially parallel to a pivot axis of the second arm relative to the second mount.

SUMMARY

There is provided a load beam for an aerial vehicle, the load beam comprising an elongate beam having a bottom. There is a plurality of load attachment points disposed along the bottom of the elongate beam. Each of the load attachment points is configured to selectively couple to a load such that the load is coupled to a first one of the load attachment points, or the load is coupled to a second one of the load attachment points and a third one of the load attachment points, whereby the load is connected to the load beam so as to be airlifted by the aerial vehicle.

The plurality of load attachment points may comprise a plurality of lugs. The plurality of load attachment points may comprise a center lug, a left lug and a right lug. The left lug and the right lug may be on opposite sides of the center lug and may be spaced equidistantly from the center lug. The load may be coupled to the first one of the load attachment points by a hook. The load may be coupled to the second one of the load attachment points and the third one of the load attachment points by respective hooks. The load may be connected to the load beam by a tether. The tether may include a plate at an end thereof. The plate may have a plurality of openings and each of the openings may be configured to receive a connector.

The elongate beam may be pivotably connected to a first mount at a first end thereof. The elongate beam may be pivotably connected to a second mount at a second end thereof. The first end and the second end of the elongate beam may each include a slot to receive a corresponding one of the first mount and the second mount. There may be a plurality of recesses disposed along at least one side of the elongate beam. The recesses may be spaced along the at least one side of the elongate beam so as to substantially align with positions of the load attachment points along the bottom of the elongate beam.

There is also provided a load beam for an aerial vehicle, the load beam comprising an elongate beam having a bottom. There are first, second and third load attachment points disposed along the bottom of the elongate beam. Each of the load attachment points is configured to selectively couple to a load such that the load is coupled to only the first load attachment point, or the load is coupled to both the second load attachment point and the third load attachment point, whereby the load is connected to the load beam so as to be airlifted by the aerial vehicle. The second load attachment point and the third load attachment point are disposed on opposite sides of the first load attachment point. The first load attachment point may be a center load attachment point. The second and third load attachment points may be disposed to the left and right of the center load attachment point.

The load may be coupled to the first load attachment point by a hook which is pivotable relative to the first load attachment point. The load may be coupled to the second load attachment point by a first hook and the load may be coupled to the third load attachment point by a second hook. The first hook may be pivotable about a first axis and the second hook may be pivotable about a second axis which is substantially parallel to the first axis.

There is further provided an aerial vehicle provided with a load beam. The load beam comprises an elongate beam having a bottom. There is a first mount pivotably coupled to the elongate beam at a first end thereof and a second mount pivotably coupled to the elongate beam at a second end thereof. There is also a plurality of load attachment points disposed along the bottom of the elongate beam. Each of the load attachment points is configured to selectively couple to a load such that the load is coupled to a first one of the load attachment points, or the load is coupled to a second one of the load attachment points and a third one of the load attachment points, whereby the load is connected to the load beam so as to be airlifted by the aerial vehicle.

The first mount and the second mount of the load beam may each be pivotably mounted to the aerial vehicle. The aerial vehicle may further include a primary quick release system and a secondary quick release system. The primary quick release system may be hydraulic. The secondary quick release system may be electric.

BRIEF DESCRIPTION OF THE DRAWINGS

The invention will be more readily understood from the following description of the embodiments thereof given, by way of example only, with reference to the accompanying drawings, in which.

DESCRIPTION OF SPECIFIC EMBODIMENTS

Figure 1:
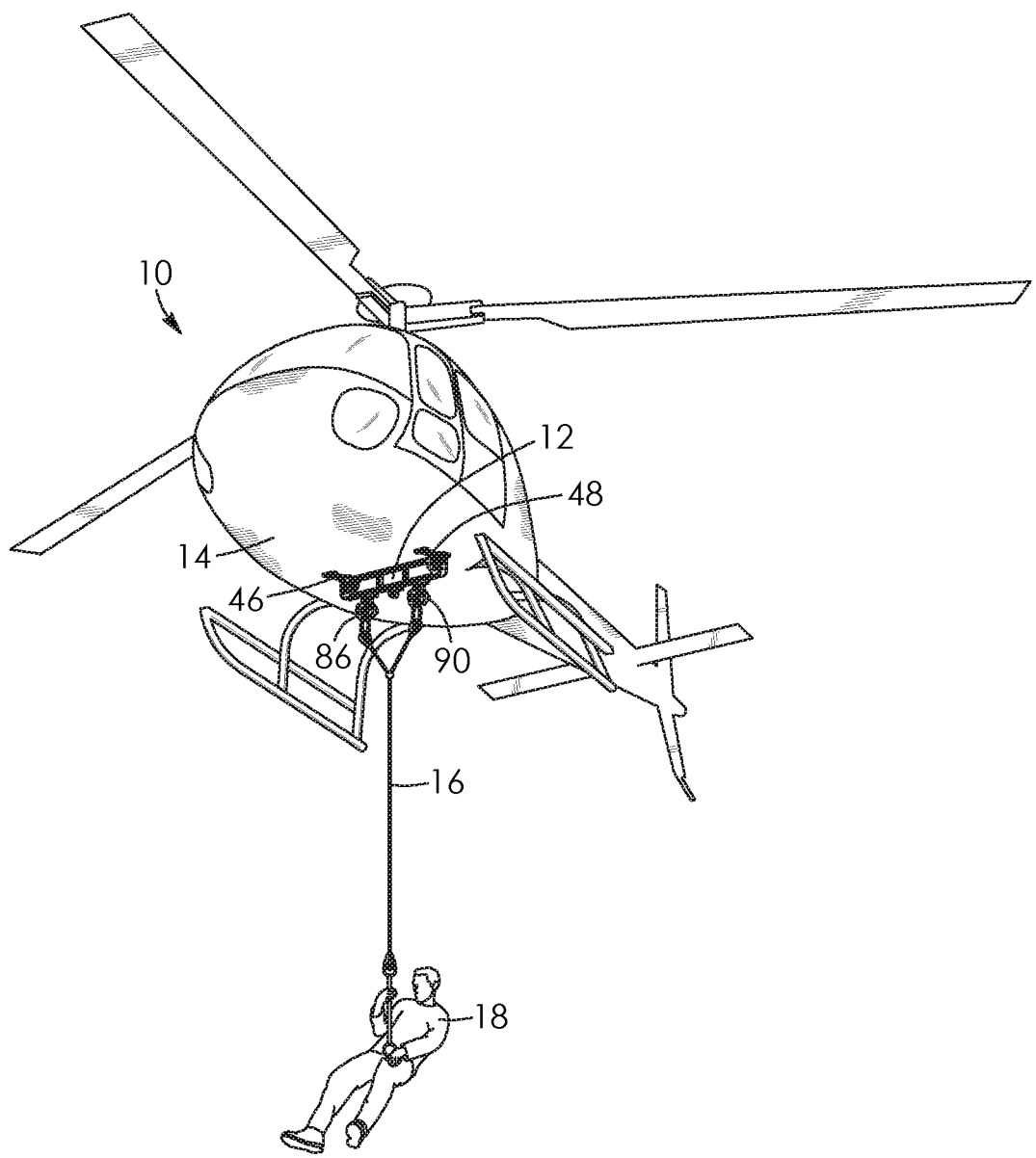
FIG. 1 is a perspective view of an aerial vehicle provided with a belly-mounted load beam showing a human load being airlifted by the aerial vehicle.

Referring to the drawings and first to FIG. 1, there is shown an aerial vehicle 10 which is provided with a load beam 12. The load beam 12 is a belly-mounted load beam and is mounted on an underside or belly 14 of the aerial vehicle 10. There is a tether 16 connected to the load beam 12. The tether 16 is also connected to a load 18 which is being airlifted by the aerial vehicle 10. In this example, the aerial vehicle 10 is a helicopter and the load 18 is a person. However, it will be understood by a person skilled in the art that the aerial vehicle 10 may be any appropriate aerial vehicle and the load 18 may be any appropriate load.

Figure 2:
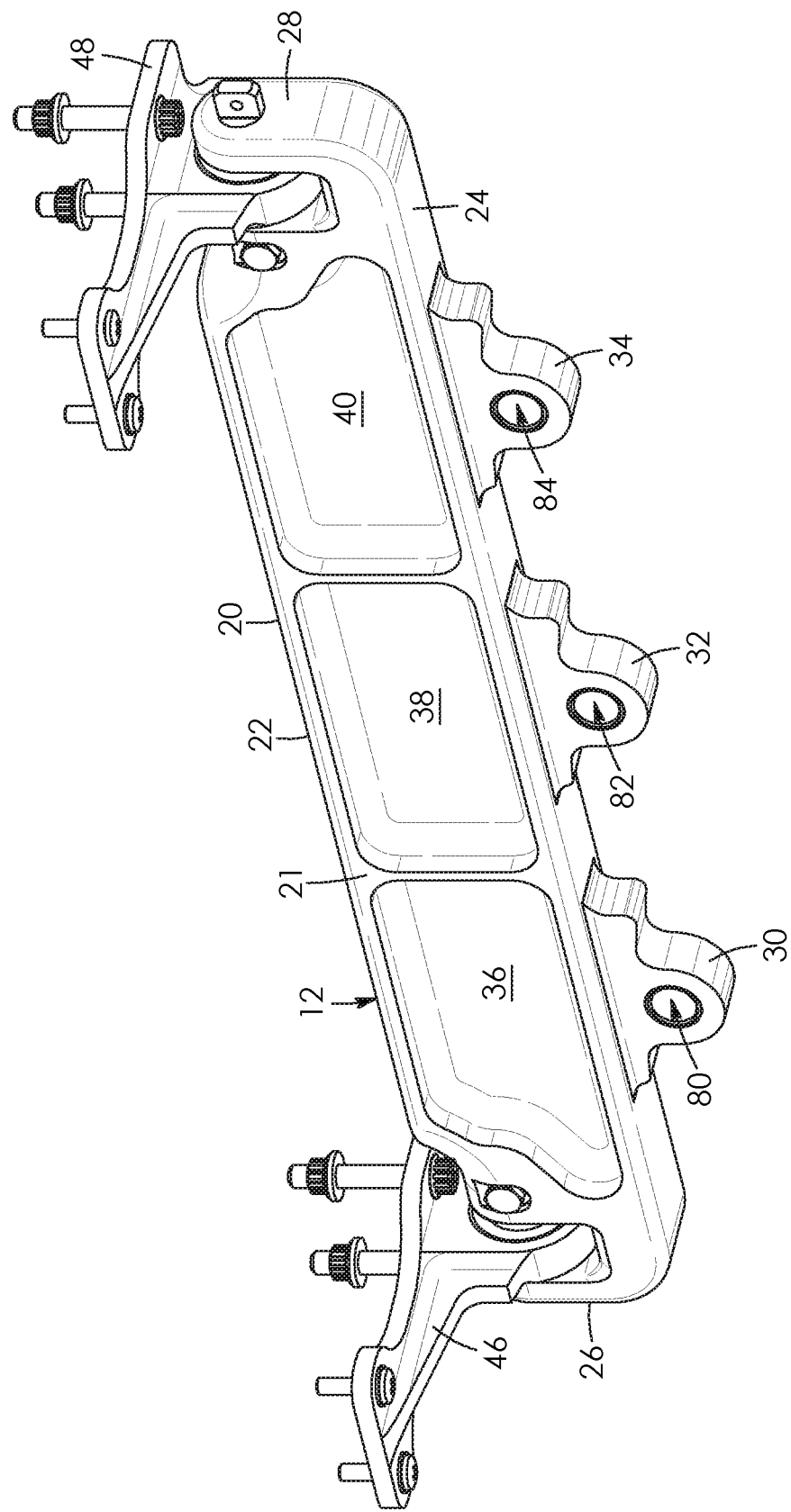
FIG. 2 is a perspective view of the load beam of FIG. 1.
Figure 3:
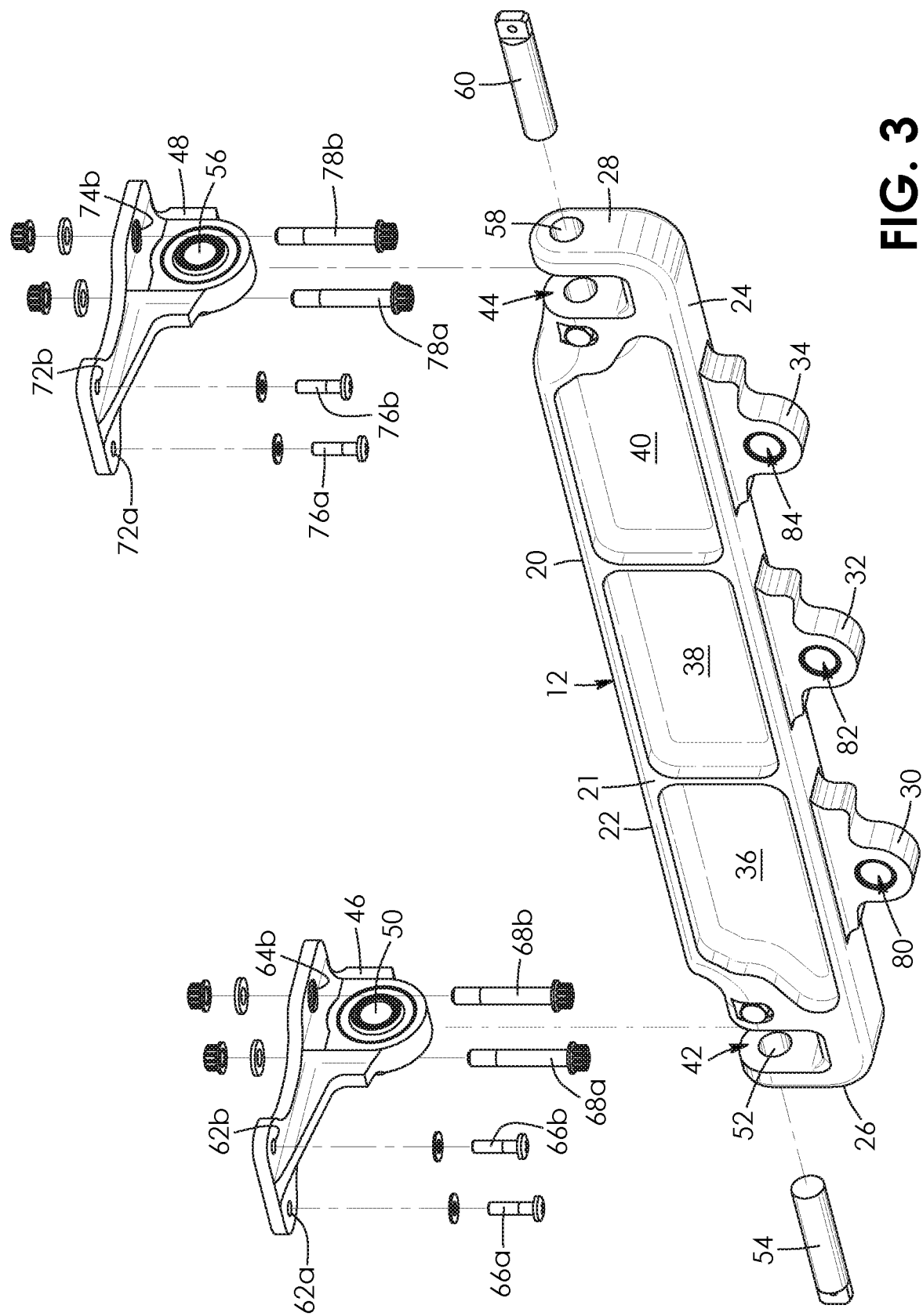
FIG. 3 is a perspective, exploded view of the load beam of FIG. 1.

Referring now to FIGS. 2 and 3, the load beam 12 is shown in greater detail and includes an elongate beam 20. The elongate beam 20 is generally rectangular in this example but may be other shapes. The elongate beam 20 includes a top 22, a bottom 24 and opposite ends 26 and 28 extending between the top 22 and the bottom 24. There is a plurality of lugs, for example, lugs 30, 32 and 34 disposed along and extending downwardly from the bottom 24 of the elongate beam 20. There is also a plurality of recesses disposed along each side of the elongate beam 20, for example, recesses 36, 38 and 40 disposed along a first side 21 of the elongate beam 20. The recesses 36, 38 and 40 are spaced along the first side 21 of the elongate beam 20 so as to generally align with the positions of the lugs 30, 32 and 34.

The elongate beam 20 further includes a first slot 42 proximate the end 26 and a second slot 44 proximate the end 28 as best shown in FIG. 3. The first slot 42 and the second slot 44 extend downwardly from the top 22 of the elongate beam 20 part way towards the bottom 24. The first slot 42 receives a first mount 46 and the second slot 44 receives a second mount 48. The first mount 46 has a through hole 50 which aligns with a through hole 52 in the first slot 42 to allow a pin 54 to couple the first mount 46 to the elongate beam 20 within the first slot 42. Similarly, the second mount 48 has a through hole 56 which aligns with a through hole 58 in the second slot 44 to allow a pin 60 to couple the second mount 48 to the elongate beam 20 within the second slot 44.

Figure 4:
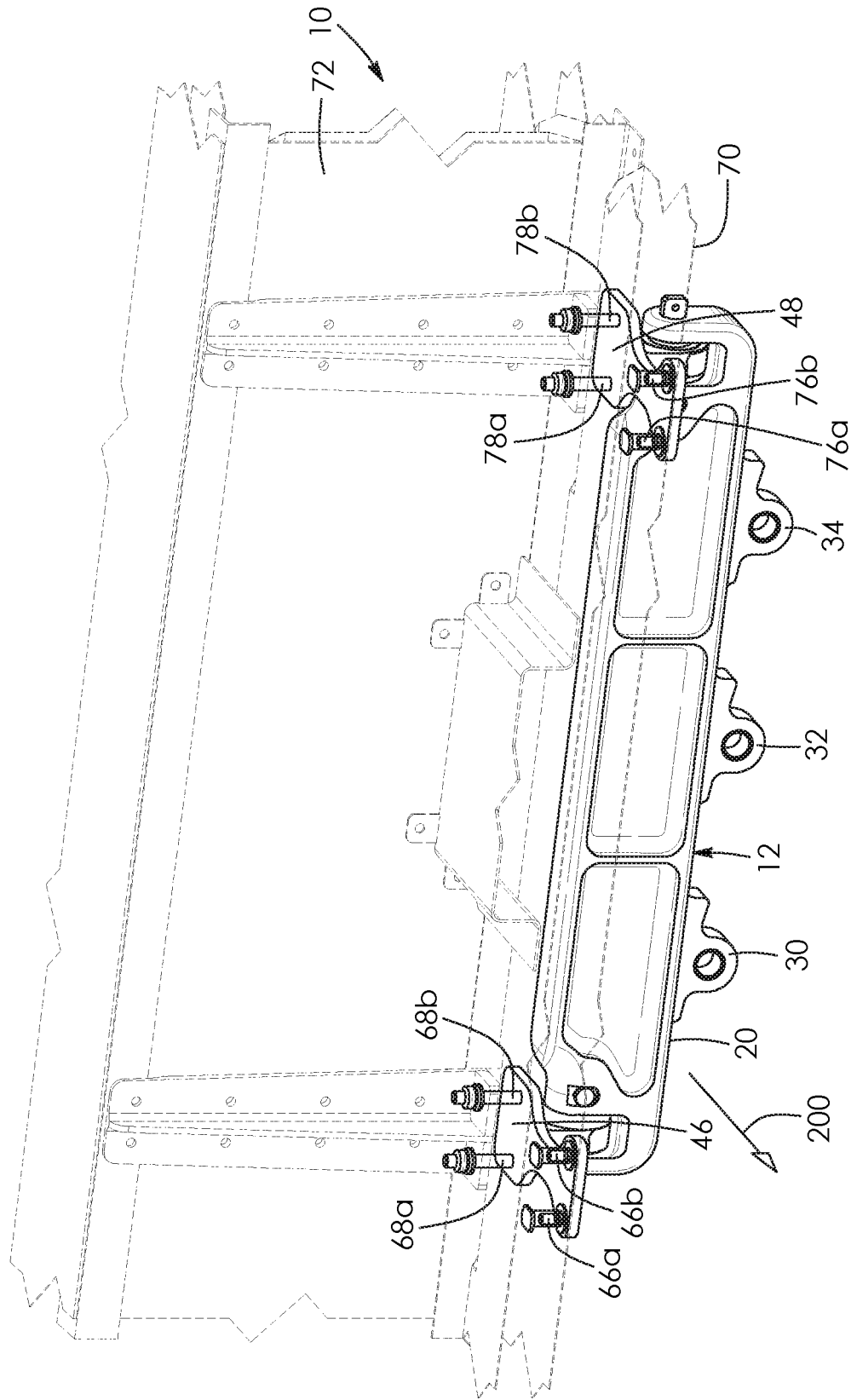
FIG. 4 is a perspective view of the load beam of FIG. 1 shown mounted to a belly of the aerial vehicle, the airframe of the aerial vehicle being shown in ghost and in fragment.

There are further through holes in the first mount 46, for example, through holes 62a, 62b and 64b shown in FIG. 3, which allow the first mount 46 to be mounted to an underside 70 of an airframe 72 of the aerial vehicle 10 via bolts, for example, bolts 66a, 66b, 68a and 68b as shown in FIG. 4. There are also further through holes in the second mount 48, for example, through holes 72a, 72b and 74b shown in FIG. 3, which allow the second mount 48 to be mounted to the underside 70 of the airframe 72 of the aerial vehicle 10 via bolts, for example, bolts 76a, 76b, 78a and 78b as shown in FIG. 4. The load beam 12 is accordingly mounted to the belly 14 of the aerial vehicle 10 via the first mount 46 and the second mount 48 as best shown in FIG. 1. The load beam 12 may be installed and removed without the use of tools via quick release pins, a dry-break hydraulic quick disconnect coupling and a bayonet type electrical connector.

FIG. 4 shows the load beam 12 mounted to the aerial vehicle 10 and facing the front of the aerial vehicle 10 as indicated by the direction of arrow 200. In this mounting arrangement, the lugs 30, 32 and 34 may be respectively described as a right lug 30, a center lug 32 and a left lug 34 from the perspective of an operator seated inside the aerial vehicle 10 and facing the front. The center lug 32 is disposed substantially in the center of the elongate beam 20. The right lug 30 is disposed on the elongate beam 20 to one side of the center lug 32 which is proximal to the right side of the aerial vehicle 10. The left lug 34 is disposed on the elongate beam 20 to the other side of the center lug 32 which is proximal to the left side of the aerial vehicle 10. In this example, the right lug 30 and the left lug 34 are spaced equidistantly from the center lug 32 on opposite sides of the center lug 32. The lugs 30, 32 and 34 serve as load attachment points on the load beam 12 as described in detail herein.

Figure 5:
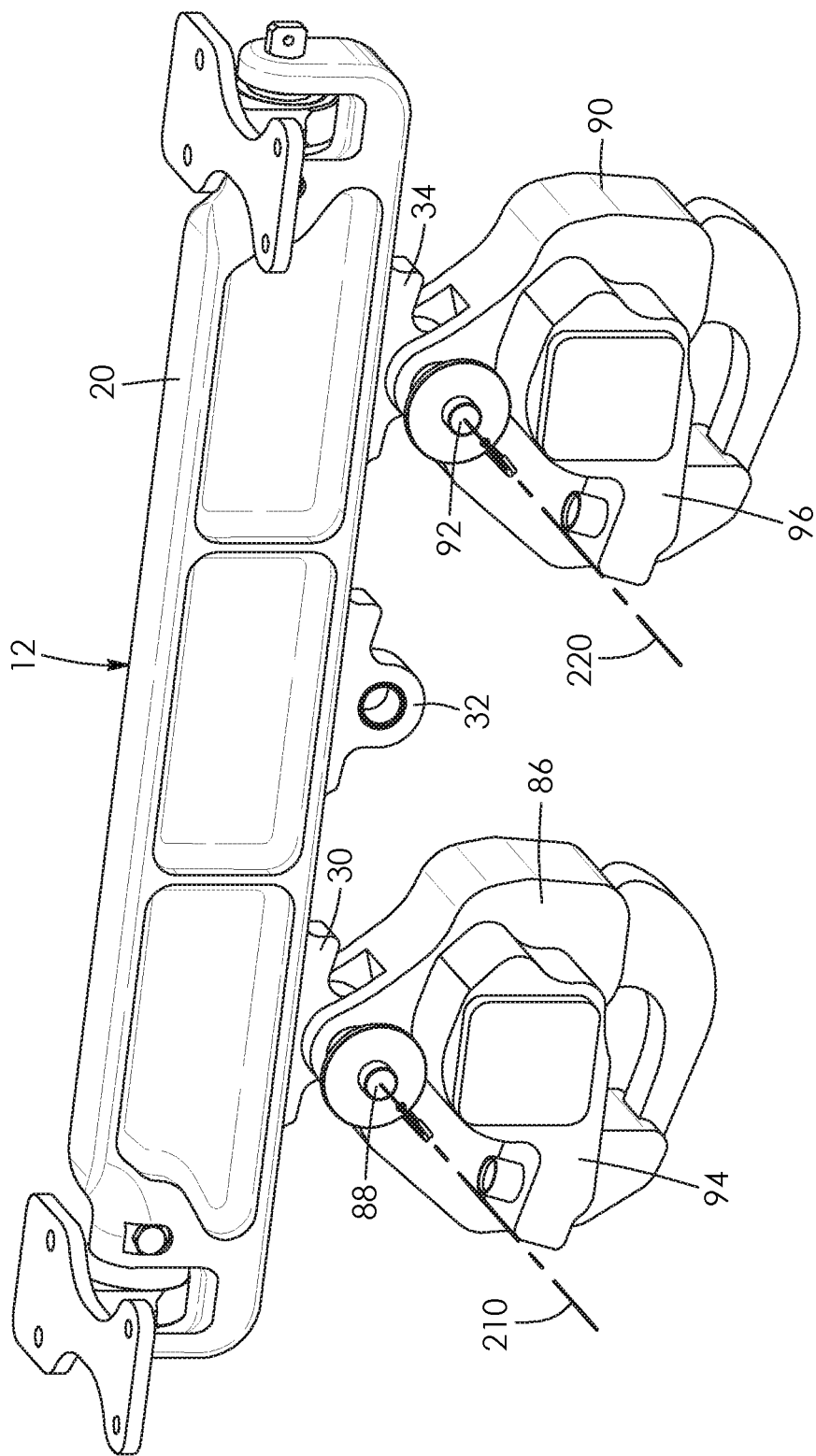
FIG. 5 is a perspective view of the load beam of FIG. 1 showing two hooks connected to the load beam.

Referring back to FIGS. 2 and 3, each of the lugs has an opening extending therethrough as shown by openings 80, 82 and 84 in the lugs 30, 32 and 34, respectively. The respective openings 80, 82 and 84 in the lugs 30, 32 and 34 allow a cargo hook to be selectively coupled to each of the lugs 30, 32 and 34. For example, FIG. 5 shows a first hook 86 pivotably coupled to the right lug 30 via a pivot pin 88 and a second hook 90 pivotably coupled to the left lug 34 via a pivot pin 92. The hook 86 is pivotable about a first axis 210 when coupled to the right lug 30. The hook 90 is pivotable about a second axis 220 when coupled to the left lug 34. The first axis 210 and the second axis 220 are substantially parallel to one another in this example. Each of the hooks is provided with a conventional locking mechanism, for example, locking mechanism 94 for the hook 86 and locking mechanism 96 for the hook 90. The hooks 86 and 90 are connected to the tether 16 as shown in FIG. 1. In this example, the tether 16 has a generally symmetrical Y-shape. The tether 16 is in turn connected to the load 18 being airlifted by the aerial vehicle 10. In this example, the load 18 is a person and two hooks 86 and 90 are used to connect the load 18 to the load beam 12. The hooks 86 and 90 work together to provide redundant attachment provisions for safety purposes. Relative pivoting of the hooks 86 and 90 also allows for balancing of the load 18 being airlifted.

Figure 6:
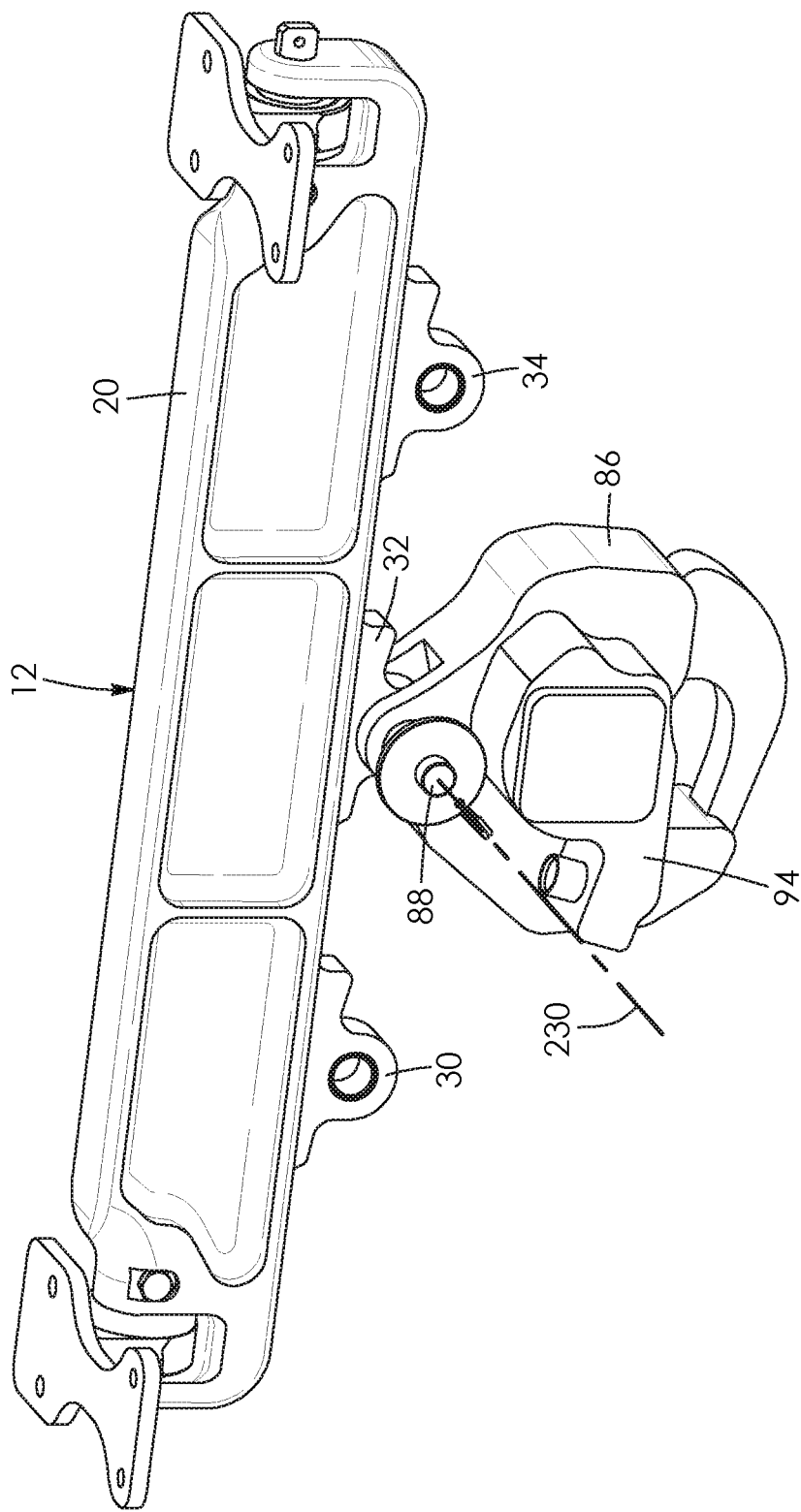
FIG. 6 is a perspective view of the load beam of FIG. 1 showing one hook connected to the load beam.
Figure 7:
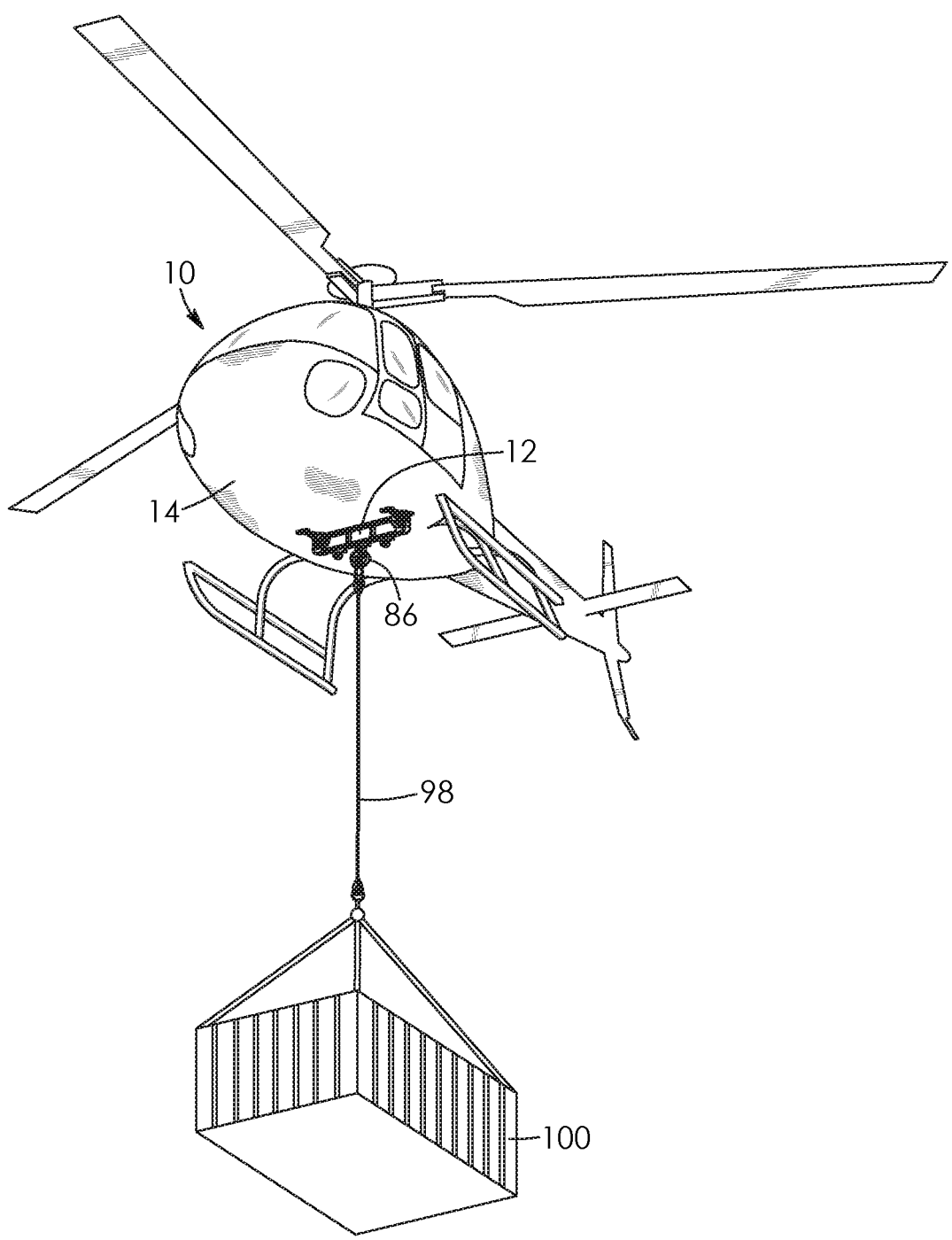
FIG. 7 is a perspective view of an aerial vehicle provided with a belly-mounted load beam showing a cargo load being airlifted by the aerial vehicle.

However, only one hook may be used to connect a load to the load beam 12. For example, FIG. 6 shows one of the hooks 86 pivotably coupled to the center lug 32 via the pivot pin 88. The hook 86 is pivotable about a third axis 230 when coupled to the center lug 32. The third axis 230 is substantially parallel to the first axis 210 and the second axis 220, shown in FIG. 5, in this example. As shown in FIG. 7, the hook 86 is connected to a tether 98 which in turn is connected to a load 100 being airlifted by the aerial vehicle 10. In this example, the load 100 is a shipping container.

Figure 8:
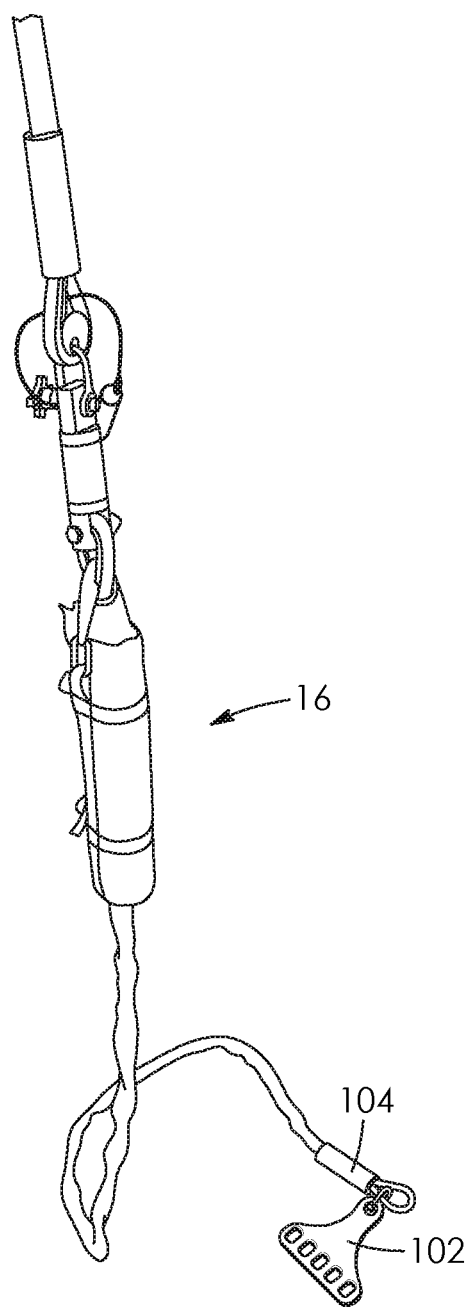
FIG. 8 is a perspective, fragmentary view of a tether for connecting a load to the load beam of FIG. 1.
Figure 9:
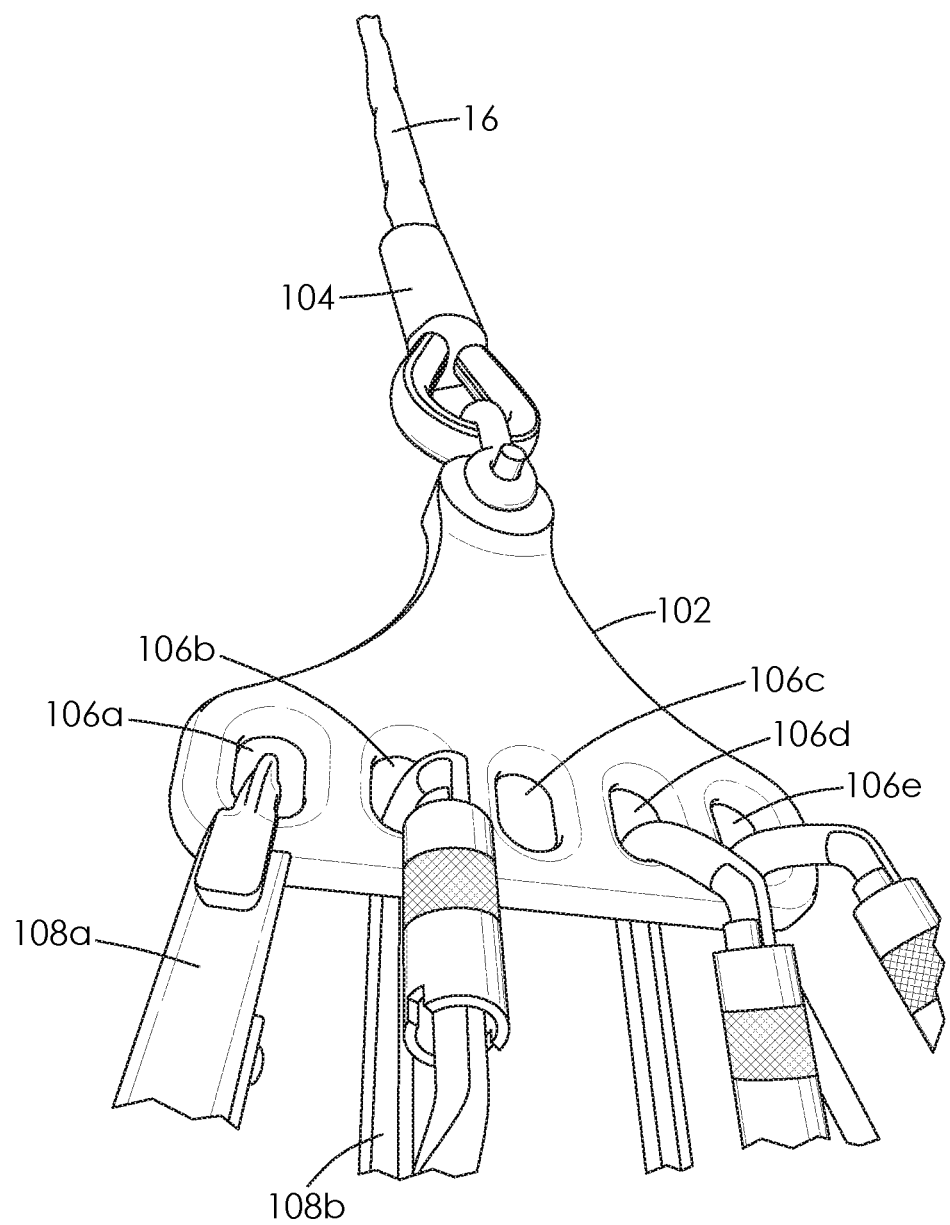
FIG. 9 is a perspective view of a rigging plate disposed at a distal end of the tether of FIG. 8.
Figure 10:
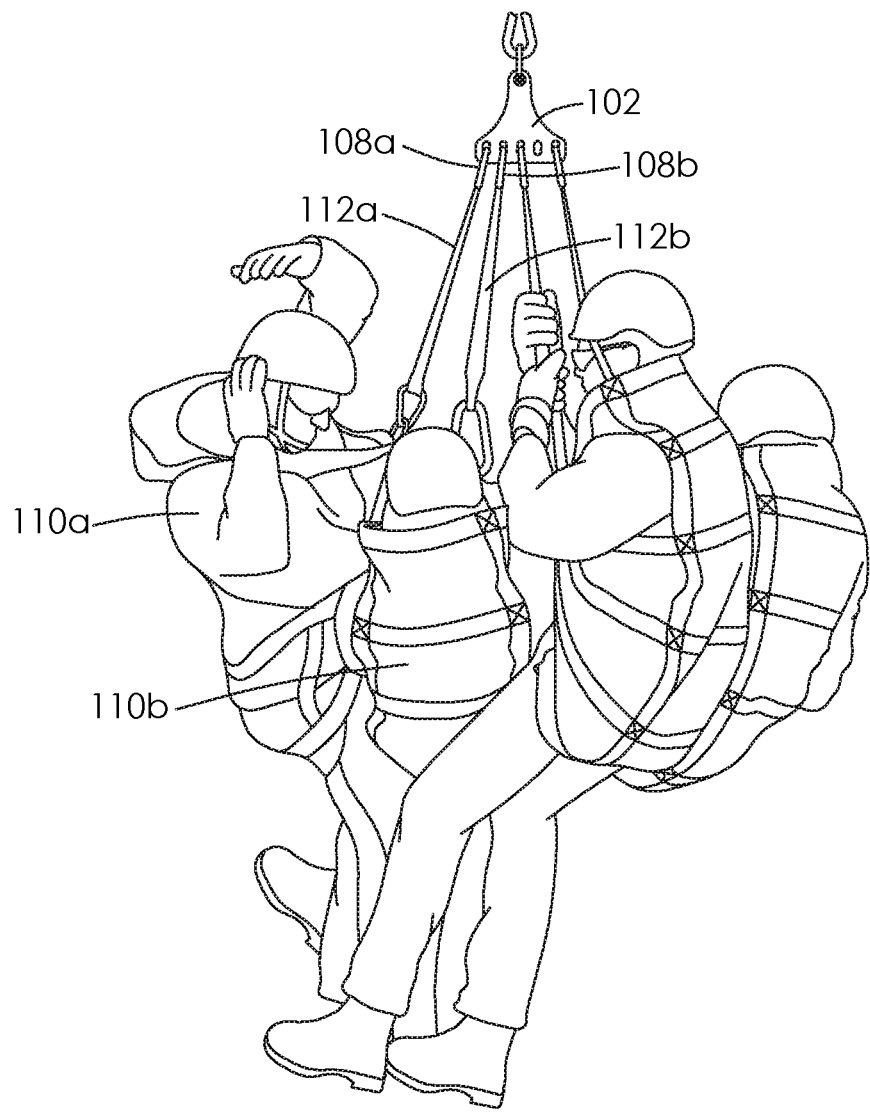
FIG. 10 is a perspective view of a plurality of human loads being airlifted by an aerial vehicle via the rigging plate of FIG. 9.

Referring now to FIG. 8, the tether 16 is shown in greater detail. There may be a rigging plate 102 at a distal end 104 of the tether 16. The rigging plate 102 is best shown in FIG. 9 and includes a plurality of openings, for example, openings 106a, 106b, 106c, 106d and 106e. Each of the openings is configured to receive a respective connector, for example, connector 108a shown for opening 106a and connector 108b shown for opening 106b. In this example, the connectors 108a and 108b are carabiners but may be other suitable connectors such as D-links or snap hooks. The openings allow each load to be individually connected to the rigging plate 102 to minimize the chance of improper connections. For example, FIG. 10 shows a first load 110a connected to the rigging plate 102 via the connector 108a and a corresponding strap 112a and a second load 110b connected to the rigging plate 102 via the connector 108b and a corresponding strap 112b. In this example, the loads 110a and 110b are persons.

Figure 11:
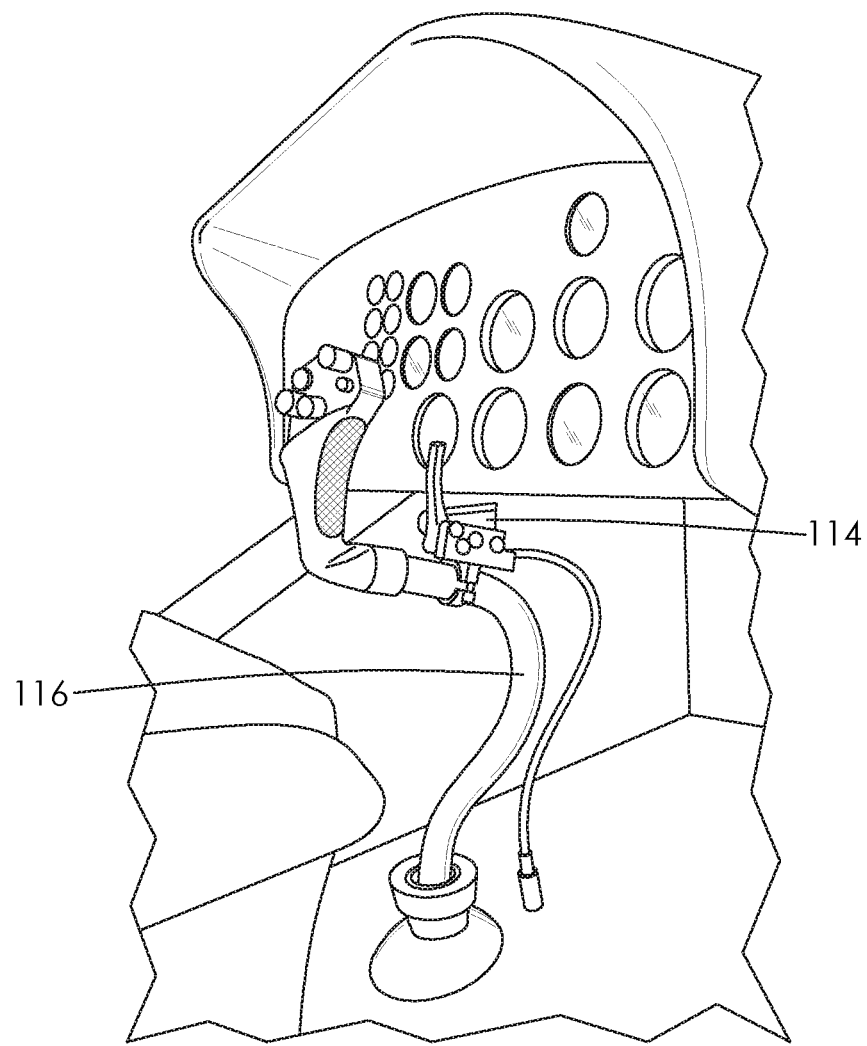
FIG. 11 is a perspective view of a primary quick release system mounted on a cyclic control stick of the aerial vehicle.
Figure 12:
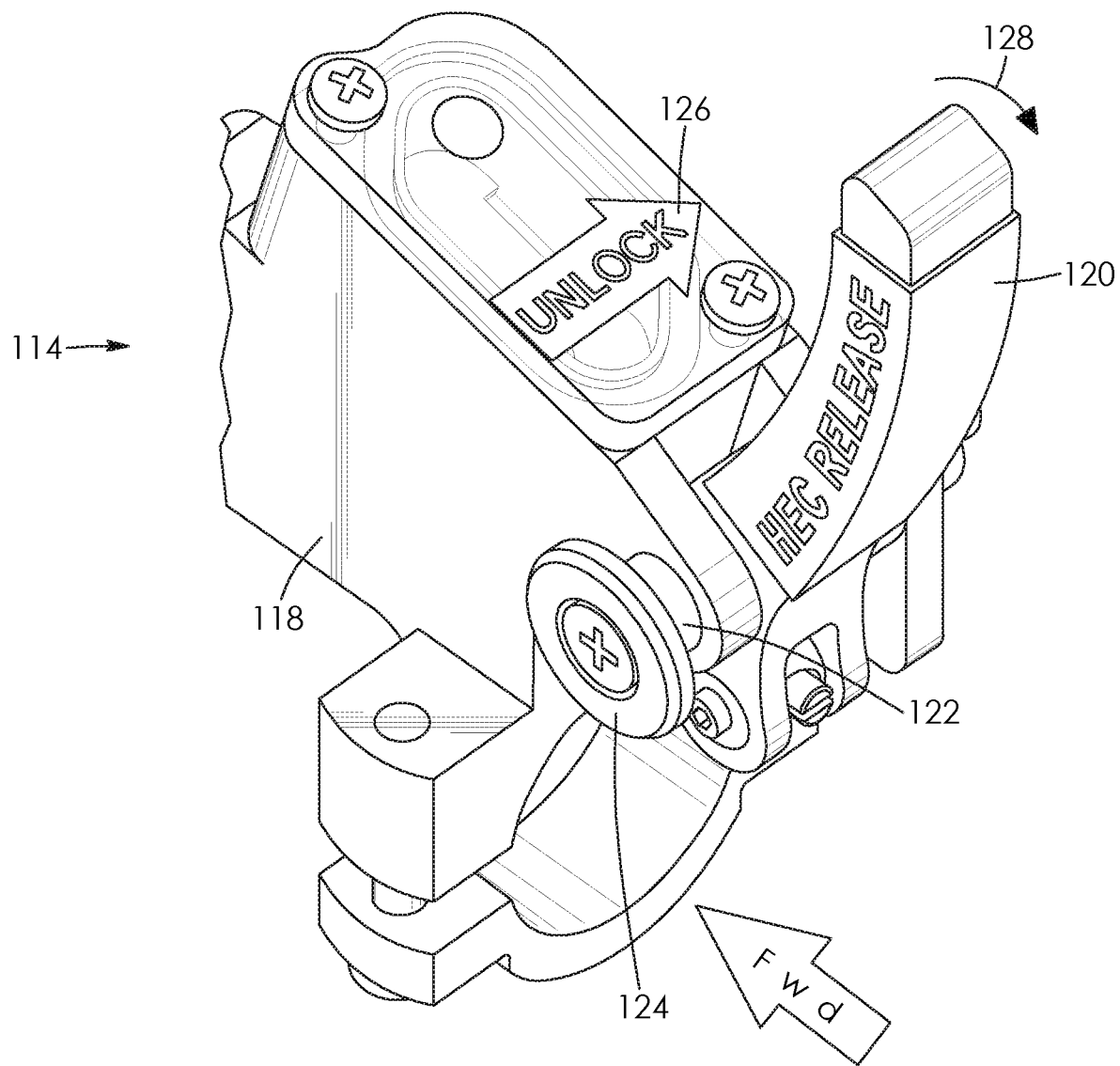
FIG. 12 is a perspective, fragmentary view of the primary quick release system of FIG. 11.

There is also provided a quick release hook assembly. As shown in FIG. 11, the pilot controlled system has a primary quick release system 114 attached to a cyclic control stick 116 of the aerial vehicle with a dual activation device system (DADS). In this example, the primary quick release system 114 is a hydraulic quick release system. The primary quick release system 114 is shown in greater detail in FIG. 12 and includes a master cylinder 118, a lever 120, and a locking pin 122 with a head 124. The master cylinder 118 is a hydraulic master cylinder in this example and is mounted on the cyclic control stick 116 of the aerial vehicle as shown in FIG. 11. Referring back to FIG. 12, the locking pin 122 is shown in the locked position. To release the hook, the head 124 of the locking pin 122 is pushed in the direction indicated by an unlock decal 126 which, in this example, is to the right. Next, the lever 120 is squeezed aft or in the direction indicated by arrow 128.

Figure 13:
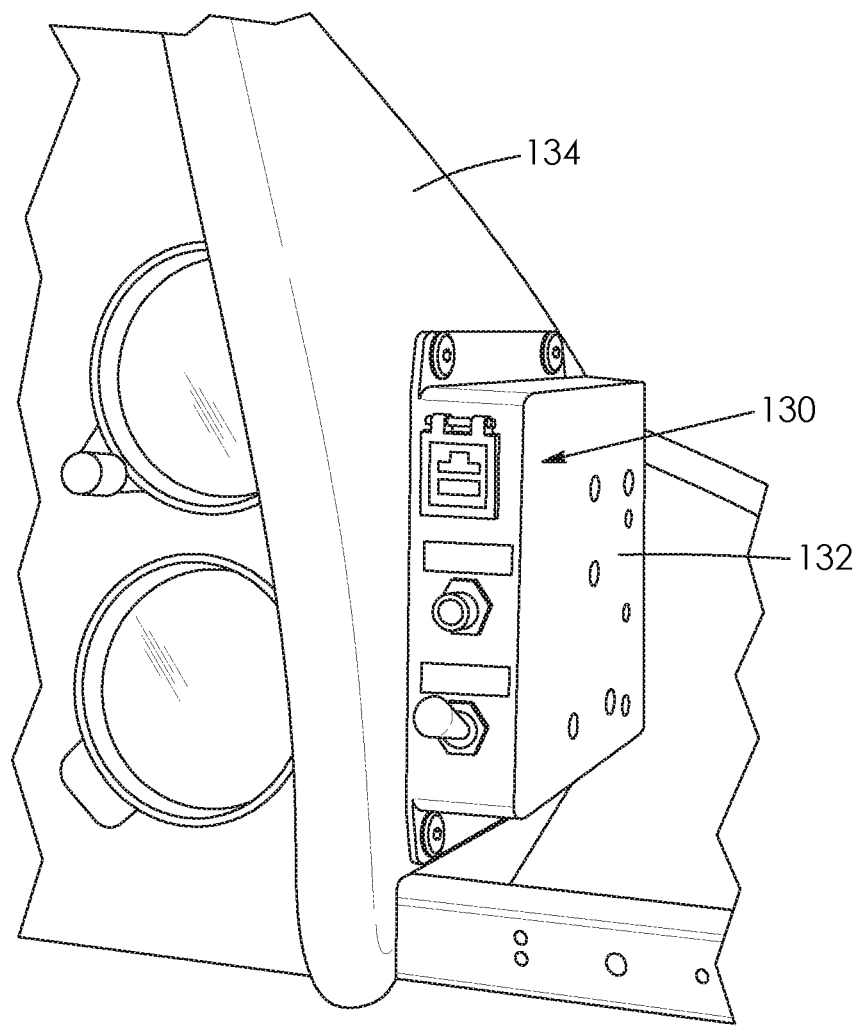
FIG. 13 is a perspective view of a backup quick release system mounted on an instrument panel of the aerial vehicle.
Figure 14:
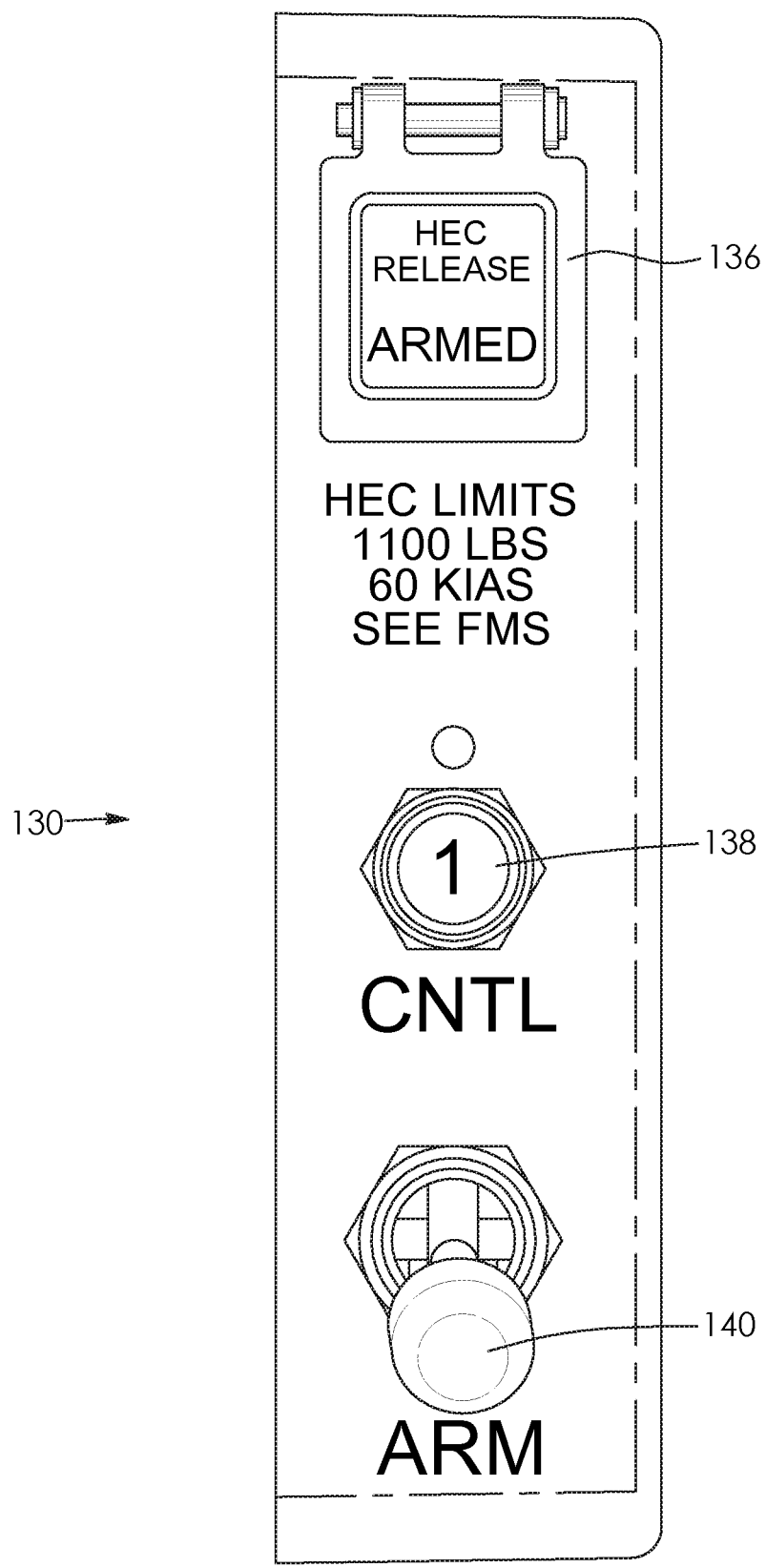
FIG. 14 is a plan view of the backup quick release system of FIG. 13.
Figure 15:
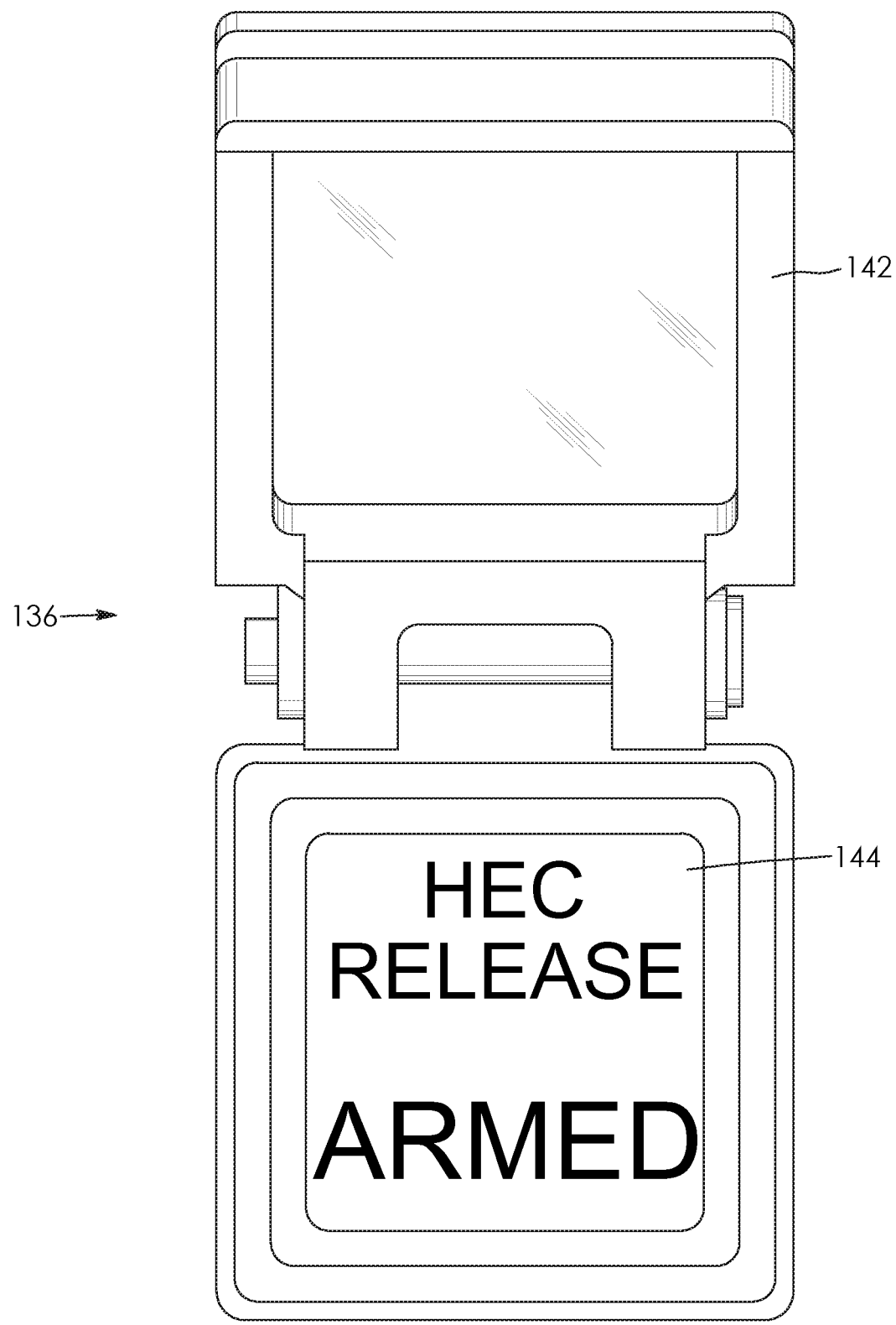
FIG. 15 is a plan view of a release switch of the backup quick release system of FIGS. 13 and 14.

There is also a backup quick release system 130 which may be controlled by an electrical box 132 mounted on an instrument console 134 of the aerial vehicle as shown in FIG. 13. The backup quick release system 130 is shown in greater detail in FIG. 14 and includes a release switch 136, a circuit breaker 138, and a lever-lock switch 140. For human external cargo operations, the release switch 136 is armed, the circuit breaker 138 is energized and the lever-lock switch 140 is in the armed position. To release the hook, a guard 142 of the release switch 136 is lifted up as shown in FIG. 15 and a pushbutton 144 is pressed. The guard 142 is spring loaded to the down position shown in FIG. 14.

Figure 16:
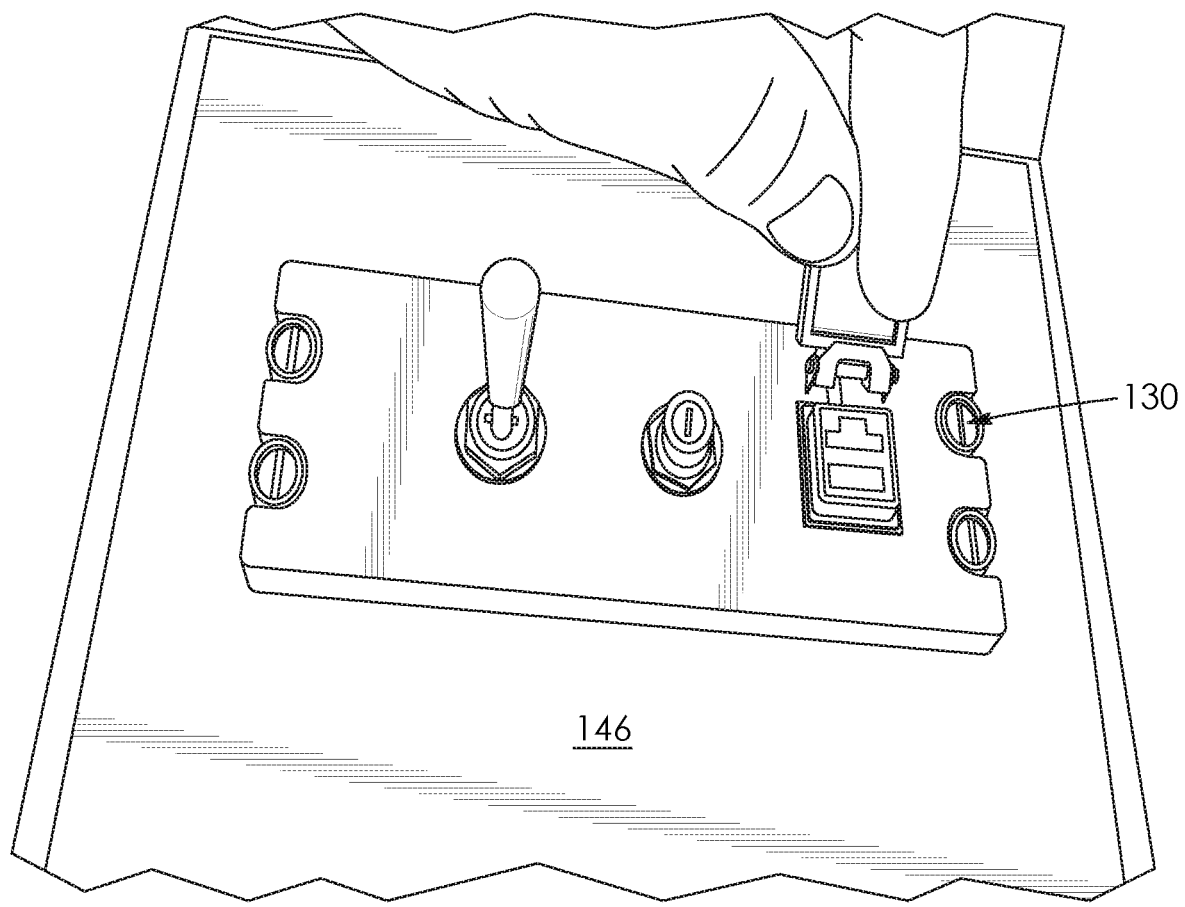
FIG. 16 is a perspective view of a backup quick release system installed in a control panel of the aerial vehicle.

Alternatively, the backup quick release system 130 may be installed in a control panel 146 of the aerial vehicle as shown in FIG. 16.

It will be understood by a person skilled in the art that many of the details provided above are by way of example only, and are not intended to limit the scope of the invention which is to be determined with reference to the following claims.

What is claimed is:

1. An aerial vehicle provided with a load beam, the load beam comprising:
    an elongate beam having a bottom;
    a first mount pivotably coupled to the elongate beam at a first end thereof and a second mount pivotably coupled to the elongate beam at a second end thereof; and
    a plurality of load attachment points disposed along the bottom of the elongate beam, each of the load attachment points being configured to selectively couple to a load such that:
    i) the load is coupled to a first one of the load attachment points, or
    ii) the load is coupled to a second one of the load attachment points and a third one of the load attachment points;
    whereby the load is connected to the load beam so as to be airlifted by the aerial vehicle.

2. The aerial vehicle as claimed in claim 1, further including a primary quick release system and a secondary quick release system.

3. The aerial vehicle as claimed in claim 2, wherein the primary quick release system is hydraulic.

4. The aerial vehicle as claimed in claim 2, wherein the secondary quick release system is electric.

5. A load beam for an aerial vehicle, the load beam comprising:
    an elongate beam having a plurality of recesses disposed along at least one side thereof; and
    a plurality of load attachment points disposed along the elongate beam, each of the load attachment points being configured to selectively couple to a load such that:
    i) the load is coupled to a first one of the load attachment points, or
    ii) the load is coupled to a second one of the load attachment points and a third one of the load attachment points;
    whereby the load is connected to the load beam so as to be airlifted by the aerial vehicle.

6. In combination, the load beam of claim 5 and one or more hooks coupled to and extending downwards from respective one or more said load attachment points, the load coupling to the one or more said load attachment points via the one or more of said hooks.

7. The load beam as claimed in claim 5, wherein the recesses are spaced along the at least one side of the elongate beam so as to align with positions of the load attachment points.

8. In combination, an elongate beam for an aerial vehicle, and a pair of spaced-apart mounts, the elongate beam coupling to the aerial vehicle via said mounts, the elongate beam having disposed therealong a plurality of load attachment points, each of the load attachment points being configured to selectively couple to a load such that:
    i) the load is coupled to a first one of the load attachment points, or
    ii) the load is coupled to a second one of the load attachment points and a third one of the load attachment points;
    whereby the load is connected to the load attachment points so as to be airlifted by the aerial vehicle.

9. The combination as claimed in claim 8, wherein the load is connectable to each said load attachment point.

10. The combination as claimed in claim 8, wherein the plurality of load attachment points comprises a plurality of lugs.

11. The combination as claimed in claim 8, wherein the plurality of load attachment points comprises a center said load attachment point, a left said load attachment point and a right said load attachment point.

12. The combination as claimed in claim 11, wherein the left said load attachment point and the right said load attachment point are on opposite sides of the center said load attachment point and are spaced equidistantly from the center said load attachment point.

13. The combination as claimed in claim 8, further including a hook, the load coupling to the first one of the load attachment points via said hook.

14. The combination as claimed in claim 8, further including a first hook and a second hook, the load coupling to the second one of the load attachment points and the third one of the load attachment points by respective said hooks.

15. The combination as claimed in claim 8, further including a tether, the load connecting to the load beam via said tether.

16. The combination as claimed in claim 15, wherein the tether includes a plate at an end thereof, the plate having a plurality of openings, each of the openings being configured to receive a connector.

17. The combination as claimed in claim 8, wherein the elongate beam is pivotably connected to the first mount and is pivotably connected to the second mount.

18. The combination as claimed in claim 17, wherein the elongate beam has a first slot to receive the first mount and wherein the elongate beam has a second slot to receive the second mount.

19. The combination as claimed in claim 8, wherein the load is coupled to the first one of the load attachment points by a hook, the hook being pivotable relative to the first one of the load attachment points.

20. The combination as claimed in claim 8, wherein the load is coupled to the second one of the load attachment points by a first hook and the load is coupled to the third one of the load attachment points by a second hook, the first hook being pivotable about a first axis and the second hook being pivotable about a second axis which is parallel to the first axis.

* * * * *